April 11, 1967 A. SABATINO ETAL 3,313,658
STORAGE BATTERY CONSTRUCTION
Original Filed Aug. 1, 1962 4 Sheets-Sheet 1
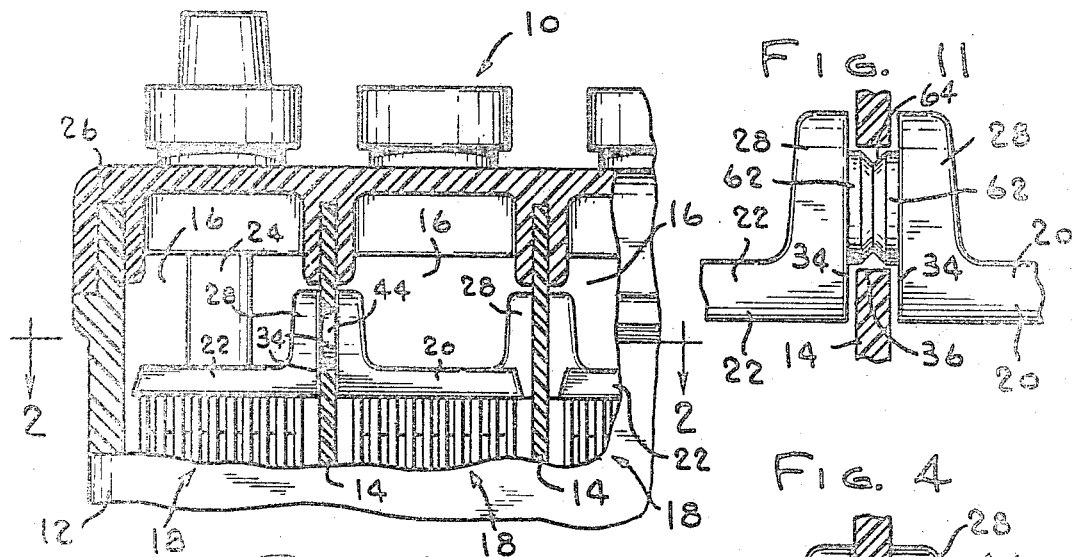
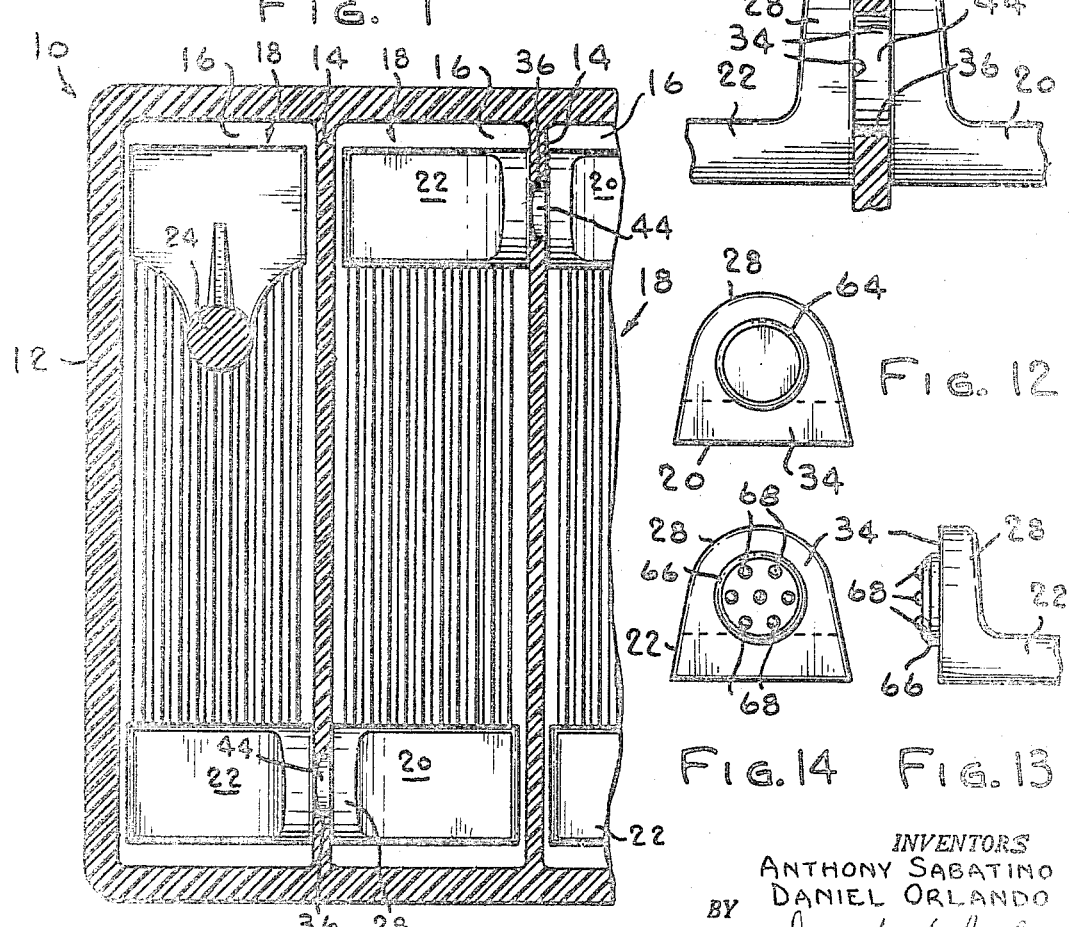
INVENTORS
ANTHONY SABATINO
DANIEL ORLANDO
BY John W. Michael
ATTORNEY INVENTORS
ANTHONY SABATINO
DANIEL ORLANDO
BY John W. Michael
ATTORNEY United States Patent Office 3,313,658
Patented Apr. 11, 1967

3,313,658
STORAGE BATTERY CONSTRUCTION
Anthony Sabatino, Minneapolis, Minn., and Daniel Orlando, Milwaukee, Wis., assignors to Globe-Union Inc., Milwaukee, Wis., a corporation of Wisconsin
Continuation of application Ser. No. 214,083, Aug. 1, 1962. This application Sept. 16, 1965, Ser. No. 491,499
3 Claims. (Cl. 136—134)

This application is a continuation of copending application Ser. No. 214,083, filed Aug. 1, 1962, now abandoned, which in turn is a division and a continuation-in-part of copending application Ser. No. 132,660, filed Aug. 21, 1961.

This invention relates to storage batteries and more particularly to improvements in the construction of intercell electrical connections for multicell batteries.

This invention is concerned specifically with intercell connections which are effected within the battery container as opposed to connections made by an external conductor connected to adjacent positive and negative cell posts extending through openings in the battery cover.

Prior connections of the "internal" type have generally been made by (1) inserting a conductor through an aperture in a cell partition, (2) sealing said conductor in the aperture, and (3) then electrically connecting it to the battery straps in the respective cells.

It is the principal object of this invention to provide an intercell connection which not only has superior mechanical and electrical characteristics but can be made by a fewer number of easily performed steps.

A further object is to provide an intercell connection of comparatively low electrical resistance, high mechanical strength, and which is tightly sealed in the aperture and to the partition wall to prevent leakage of electrolyte between adjacent cells.

The objects of this invention are attained by providing an open top storage battery case having a partition which divides the case into at least two separate compartments, said partition having an aperture. Battery elements are positioned in each of the battery compartments which include a strap having a connector lug thereon precast to the elements. Each lug has a sealing face thereon provided with an area adapted for interconnection through said aperture. The elements are positioned in the compartments so that the area on one connector lug is in contact, directly or indirectly (by an intermediate member), with the area on the connector lug in the adjacent compartment through the aperture. These areas are joined by a pressurized resistance weld and the aperture is completely and tightly filled with the lug material to form a seal preventing leakage or electrolyte between cells. An annular ring is provided on the face of each strap which will seat into the cell partition to form a positive seal therewith.

The method of welding adjacent areas to each other and sealing the welded portion in the partition aperture is comprised broadly of three stages, the "squeeze," "weld," and "hold" stages as disclosed in said copending Sabatino et al. application Ser. No. 132,660.

Other objects and advantages will be pointed out in, or be apparent from, the specification and claims, as will obvious modifications of the several embodiments shown in the drawings, in which:

FIG. 1 is a side elevation view of a completely assembled storage battery with part of the casing broken away to show the internal construction of an intercell connection made in accordance with the present invention;

FIG. 2 is a fragmentary sectional view taken along line 2—2 of FIG. 1;

FIGS. 3 and 4 are fragmentary side elevation views showing the parts before and after the intercell connection is made;

FIG. 11 is a fragmentary side elevation view of another modified form of connector lugs;

FIG. 12 is an end elevation view of one of the modified connector lugs shown in FIG. 11;

FIGS. 13 and 14 are side and end elevation views of another modified form of connector lug;

Figure 3:
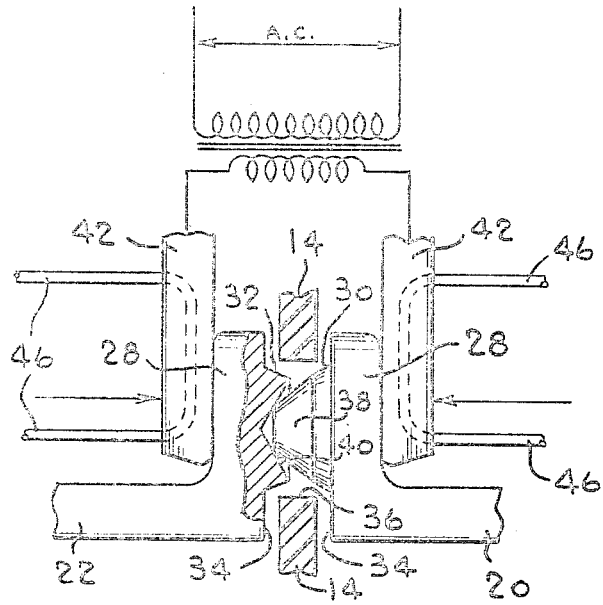

Referring to the drawings in detail, FIGS. 1 and 2 show a battery 10 comprising a casing 12 having a plurality of partition walls 14 molded integrally with the casing 12 to form cell chambers 16. A battery element 18 is mounted in each chamber 16. Elements 18 are of conventional design and include positive and negative plates alternately arranged with suitable separators with straps 20 and 22 of opposite polarity cast to the respective positive and negative plates of each element. The elements in the end cell chambers are provided with terminal posts 24 (one shown) which extend upwardly through battery cover 26 for external electrical connection in the circuit in which the battery is to be used.

Figure 5:
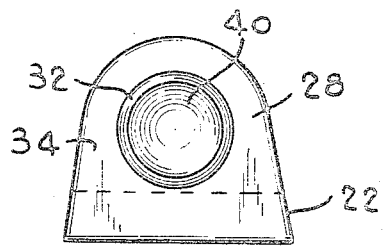
FIGS. 5 and 6 are end elevation views of the connector lugs and projections shown in FIG. 3.
Figure 6:
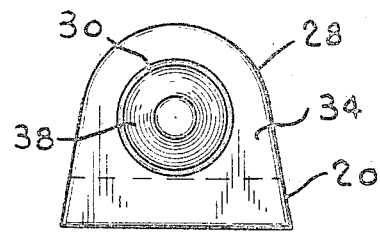
Figure 7:
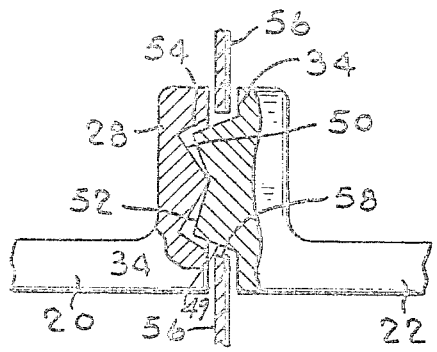
FIGS. 7 and 8 are fragmentary side elevation views showing a modified set of connector lugs and projections before and after the connection is made.
Figure 9:
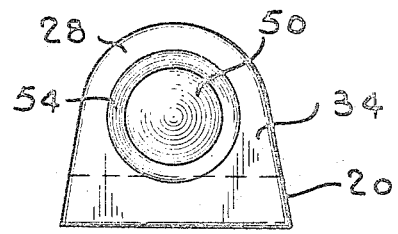
FIGS. 9 and 10 are end elevation views of the connector lugs shown in FIG. 7.
Figure 8:
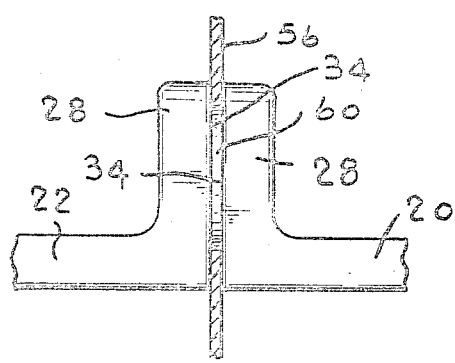
Figure 10:
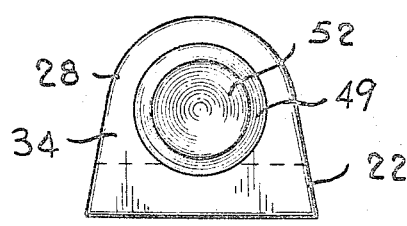

Referring now to FIGS. 3, 5 and 6, straps 20 and 22 (other than those having a terminal post 24 thereon) are provided with an upstanding connector lug 28 having projections 30 and 32 extending horizontally from a flat sealing face 34 thereon. The connector lugs and projections are cast integrally with straps 20, 22 and are preferably of lead. The straps are cast to the plates of the elements by any suitable method and apparatus such as that described generally in copending application Ser. No. 79,728 and United States Patent No. 3,087,005.

Elements 18 are installed in cell chambers 16 by any suitable means with projections 30 and 32 on connector lugs 28 aligned with apertures 36 in partition walls. Apertures 36 are made in walls 14 by any suitable means such as punching prior to installation of the elements in the casing.

After elements 18 have been installed in the casing 12 and properly positioned in the cell chambers, projections 30 and 32 will assume the position shown in FIG. 3. The parts are now ready for completion of the intercell connection between a negative strap of one element with a positive strap of the next adjacent element.

While the particular configuration of the projections can take many forms, the configuration shown in FIG. 3 has a projection 30 provided with a conical nose 38 which registers with a conical depression 40 in projection 32. The tip of nose 38 has been cut off as shown to facilitate installation of the element in the cell chamber. It will be noted that the included angle of depression 40 is greater than that of nose 38. The significance of this construction will be explained in detail hereinafter.

Figure 15:
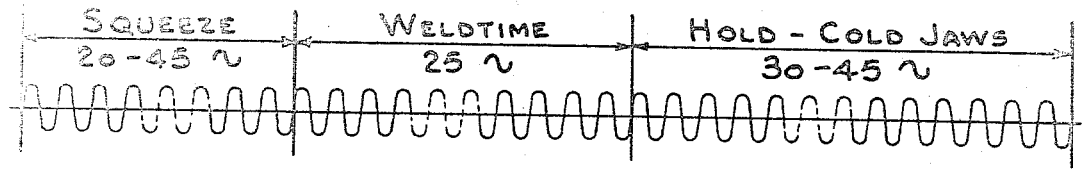
FIG. 15 is a diagram showing the three stages which comprise the method of this invention.

The method of making the intercell connection is comprised broadly of three stages termed, for purposes of explanation, the "squeeze," "weld," and "hold" stages which are shown diagrammatically in FIG. 15 and specifically described in said copending Sabatino et al, application Ser No. 132,660.

During the first or "squeeze" stage, projections 30 and 32 are squeezed together by any suitable means such as a pair of power actuated jaws 42, as shown in FIG. 3.

This initial squeeze period serves several important purposes. First, it serves to accurately align projections 30, 32 by forcing nose 38 into engagement with depression 40. Secondly, it provides a short dwell time to permit stabilization of the power cylinder (not shown) used to close jaws 42 to thus eliminate the effect of any "bounce" at the jaws as the actuating cylinder is energized to apply pressure at the projections. Third and most important is that the "squeeze" period insures the application of a predetermined amount of pressure at the projections prior to the passage of electric current through the projections during the subsequent "weld" stage presently to be described. As will be explained, the heat produced by such current will vary with the resistance at the area of contact which, in turn, will vary with the pressure at the contact area. Thus, by controlling the pressure at the contact area it is possible to exercise some control over the heat produced during the "weld" stage.

The duration of the squeeze time is from 20 to 45 cycles (1 cycle=1/60 sec.) and the pressure applied by jaws 42 is about 600 pounds.

The next stage is the "weld" stage during which period an electric current is passed through projections 30, 32 to produce heat for welding the two parts together. During this period there are variations in the heat energy produced, the physical upset of the parts, the electrical resistance at the contact area, and the pressure at the contact area. Such variations are shown diagrammatically in FIG. 16.

As previously stated, it is important that the amount of heat energy produced be controlled as accurately as possible. It is also important to build up to the desired level of heat energy very rapidly once the "weld" stage begins. This is accomplished by designing projections 30, 32 so as to produce a high initial resistance at the contact area which in turn will produce a rapid build-up of heat when a welding current is applied. Such high initial resistance is produced by providing a relatively small initial contact area between projections 30 and 32. As shown in FIG. 3, the included angle of tip 38 on projection 30 is less than the included angle of depression 40 in projection 32. In this embodiment these angles are 80 and 120 degrees, respectively. By making the two angles different it will be seen that there will be only a line contact between the two parts prior to welding to thus provide a high initial resistance to the welding current.

Figure 16:
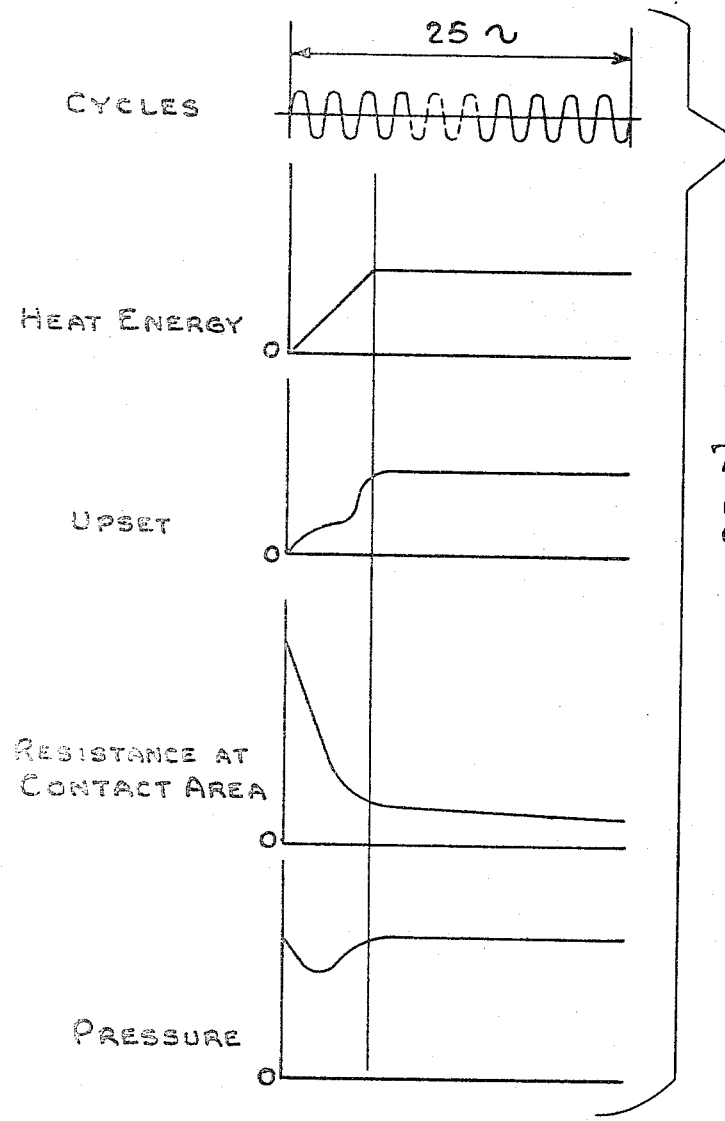
FIG. 16 is a more detailed diagrammatic breakdown of the "weld" stage of the method.

As shown in FIG. 16, when current is applied to jaws 42 the heat energy at the projections will build up very rapidly to a maximum point in about 1 to 1½ cycles. During this initial build-up of heat energy, the lead projections will soften and be upset from the position and configuration shown in FIG. 3 to that shown in FIG. 4. As the projections fuse and flow together under pressure, the area of contact will increase rapidly to thereby reduce the resistance which, in turn, will stabilize the heat energy produced and thus prevent a "blow-out" of the weld due to excessive heat. A thoroughly fused connector portion 44 is produced as shown in FIG. 4.

As shown in FIG. 16, the total physical upset of the parts occurs during the first few cycles of the weld stage and a rapid drop in electrical resistance also occurs during these first few cycles. It is noted that the pressure at the projections will drop off slightly as the lugs are pressed together. The pressure then returns to its initial level after upset is complete and the faces 34 on lugs 28 are pressed into contact with partition wall 14.

In the preferred embodiment of the method the "weld" stage lasts for about 25 cycles during which time approximately 25,000 watt/seconds of energy is supplied to the projections. The electrical energy is provided by 6-volt A.C. which averages about 10,000 amps during the "weld" stage. The energy supplied during the "weld" stage is supplied at either a constant or varying rate depending primarily on the particular configuration of the projections.

The third and final stage is the "hold" stage during which time the pressure at the lugs 28 is maintained and the weld area is cooled to produce a sound weld at the connector portion 44 (FIG. 4). In the preferred embodiment the "hold" stage continues for about 30 to 45 cycles during which time the 600 pound force is maintained by jaws 42. Cooling is accomplished by any suitable means such as by circulating water or other medium at about 40° F. through jaws 42 by any suitable means such as conduits 46 as shown in FIG. 3.

The completed connection 44 provides a double seal between adjacent cell chambers 16. By virtue of the pressure applied to the lugs during the welding operation, faces 34 on lugs 28 will be forced into and held in sealing engagement with opposite sides of partition walls 14 upon completion of the weld.

A second seal is produced between connector portions 44 and the walls of apertures 36. Projections 30, 32 are designed so that the total volume thereof is about 3–12% greater than the volume of apertures 36 in the partition walls. Thus, as the projections are fused together in the aperture under pressure the lead will be forced into sealing engagement with the aperture walls which tends to enlarge the apertures slightly. Not only is a tight mechanical seal created in this area but due to the heat present there appears to be a further chemical bond created by carbonization of the battery case when made of a rubber base material with plastic binders.

Referring now to the several modifications of the invention shown in FIGS. 7–14 and 17–18, FIGS. 7, 8, 9 and 10 show a first modification designed specifically for use with a thin-walled battery case of the type employing a hydrocarbon polymer plastic in which the walls are not in excess of 0.100 inch. It is noted, however, that this modification could be used with the standard heavy wall battery case as well. This modification is similar to the preferred embodiment shown in FIG. 3 in that it includes a lug 28 having a projection 49 with a depression 52 therein which registers with a conical point 50 on the other lug 28. Conical point 50 is recessed in the face of the connector lug as at 54 to receive projection 49 and thereby provide a confined area for the molten metal to compensate for the thin-walled partition 56 having an aperture 58 which provides a comparatively small enclosure for the fused metal. The parts are welded to produce a sealed connector portion 60 (FIG. 8) by the same general steps outlined above with some variation in the details relating to cycles per stage, watt/seconds of energy applied, etc.

The modifications shown in FIGS. 11–13 are included to show a few of the many different types of projections which could be employed. FIGS. 11 and 12 show a projection 62 having a chamfer 64 which provides a relatively large initial contact area making it desirable to provide some outside means to control the amount of watt/seconds of energy used during the "weld" stage. As explained previously, with the embodiment shown in FIG. 3 such control is more or less built-in due to the particular configuration of the projections.

FIGS. 13 and 14 show another modification similar to that shown in FIG. 11 which comprises a projection 66 having bumped-up portions 68 thereon to reduce the initial contact area between the two parts.

Figure 17:
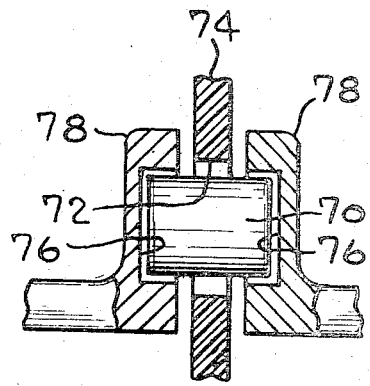
FIGS. 17 and 18 are side elevation views of another modification before and after welding.
Figure 18:
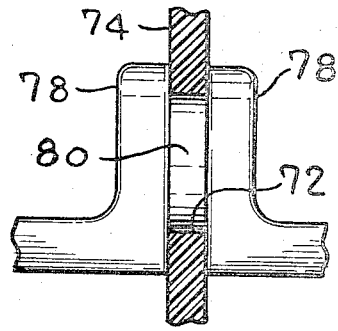

FIGS. 17 and 18 show another modification which includes an intermediate insert member 70 fitted in an aperture 72 in partition wall 74. Member 70 may be of any suitable cross-sectional shape (round, square, etc.) with its ends seated in recesses 76 in connector lugs 78 as shown in FIG. 17. The parts are welded together in a single welding operation to produce a connector portion 80 (FIG. 18) by the same general steps outlined above. Connector portion 80 is in sealing engagement with the wall of aperture 72 and serves to hold lugs 78 in sealing engagement with opposite sides of partition wall 74 in the same manner as connector portion 44 (FIG. 4) described above.

Figure 19:
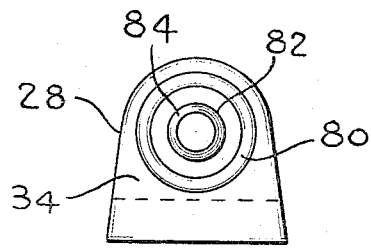
FIG. 19 is a front elevation view of an improved seal.
Figure 20:
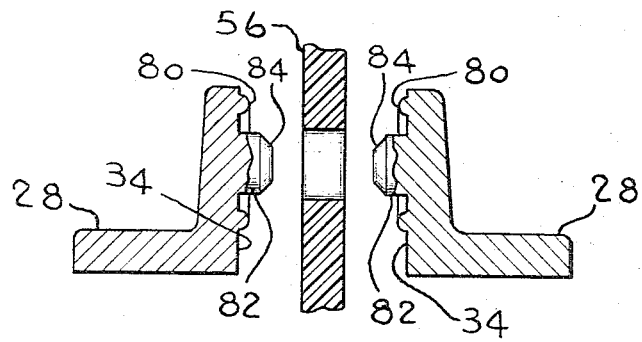
FIGS. 20 and 21 are side elevation views before and after the seal is made.
Figure 21:
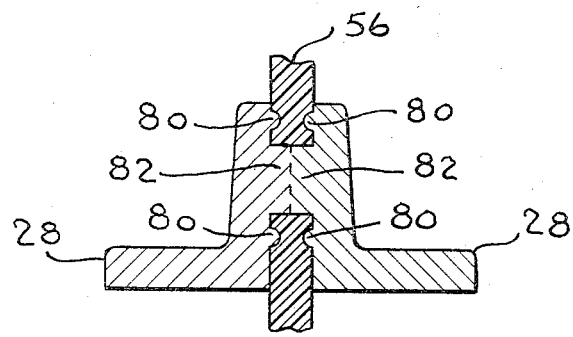

The seal provided by the projections shown in FIGS. 5 through 14 and 17 and 18 normally will provide an adequate seal between the faces of the lugs and the partition wall. However, a change in the material of the partition, change in product design, or some other unknown condition may require a more positive seal. Such a seal is shown in FIGS. 19 through 21 wherein an annular ring 81 is integrally cast on the faces 34 of lugs 28. The ring is equally spaced from projections 82 which have frustoconical ends 84 to provide minimum contact areas in conformance with the requirements set forth above. The height of the O-rings must be less than one-half the thickness of partitions 56 and must be sufficiently narrow to break through the surface of the partition when squeezed thereagainst.

It may not be necessary that the projections on the straps be integral or that each strap have a projection. The essential thing is that each strap have an area which is electrically connected through the aperture by enough metal and proper size areas of contact so that the welding current will melt the metal and cause it to fuse the straps and rigidly seal the aperture.

It will be appreciated that all three stages of the above described method can be performed by relatively simple apparatus well adapted for mass production welding manufacturing techniques. The "squeeze," "weld" and "hold" steps can all be performed by a single set of power jaws in what amounts to a single mechanical operation. Since the lugs and projections thereon are all cast integrally with the straps prior to insertion of the elements in the case, the intercell connection is completed by a single operation performed by jaws 42. It will be appreciated that by incorporating a plurality of jaws into a piece of automatic machinery all the intercell connections for an entire battery can be made simultaneously in a matter of a few seconds.

Although several embodiments of the present invention have been illustrated and described, it will be apparent to those skilled in the art that various changes and modifications may be made therein without departing from the spirit of the invention or from the scope of the appended claims.

We claim:

1. A connector means for electrically connecting the plates of two battery elements of a storage battery through an aperture in a partition wall of the battery case comprising:

a first metal strap member electrically connected to the positive plates of one element;

a second metal strap member electrically connected to the negative plates of the second element;

an imperforate connector lug formed on each of said strap members, each of said connector lugs having a face thereon overlying the aperture on opposite sides of the partition wall; and a metal connector portion positioned inside said aperture with its opposite ends connected to said lug faces on said connector lugs, the material of said metal connector portion being in sealing engagement with the wall of said aperture and said connections between the ends of said connector portion and said lug faces being heat fused connections.

2. A connector means for electrically connecting the plates of two battery elements of a storage battery through an aperture in a partition wall of the battery case comprising:

a first metal strap member electrically connected to the positive plates of one element;

a second metal strap member electrically connected to the negative plates of the second element;

an imperforate connector lug formed on each of said strap members, each of said connector lugs having a sealing face thereon overlying the aperture on opposite sides of the partition wall, said sealing faces lying in sealing engagement with said wall; and a metal connector portion positioned inside said aperture with its opposite ends connected to said sealing faces on said connector lugs, the material of said metal connector portion being in sealing engagement with the wall of said aperture and said connections between the ends of said connector portion and said sealing faces being heat fused connections.

3. A connector means for electrically connecting the plates of two battery elements of a storage battery through an aperture in a partition wall of the battery case comprising:

a first metal strap member electrically connected to the positive plates of one element;

a second metal strap member electrically connected to the negative plates of the second element;

an imperforate connector lug formed on each of said strap members, each of said connector lugs having a face thereon overlying the aperture on opposite sides of the partition wall; and a metal connector portion positioned inside said aperture and lying in contact with said connector lugs to provide a low resistance electrical path between said lugs, said metal connector portion being in sealing engagement with the wall of said aperture, said metal connector portion being further characterized by being formed of material projecting from said lugs which has been heat fused together inside said aperture.

References Cited by the Examiner

UNITED STATES PATENTS

| | | | |
|---|---|---|---|
| 2,180,959 | 11/1939 | Hopkins | 136—134 |
| 2,715,152 | 8/1955 | Balzer | 220—46 |
| 2,720,329 | 10/1955 | Kochner | 220—46 |
| 2,906,804 | 9/1959 | Rigsby | 136—134 |
| 2,942,055 | 6/1960 | Doyle et al. | 136—134 |
| 2,942,059 | 6/1960 | Doyle et al. | 136—176 |

WINSTON A. DOUGLAS, *Primary Examiner.*

D. L. WALTON, *Assistant Examiner.*

UNITED STATES PATENT AND TRADEMARK OFFICE
CERTIFICATE OF CORRECTION

PATENT NO. : 3,313,658

DATED : April 11, 1967

INVENTOR(S) : Anthony Sabatino and Daniel Orlando

It is certified that error appears in the above-identified patent and that said Letters Patent are hereby corrected as shown below:

In the heading regarding assignee Globe-Union, col. 1, line 5, delete "Wisconsin" and substitute --Delaware--.

Signed and Sealed this

Twenty-third Day of August 1983

[SEAL]

Attest:

Attesting Officer

GERALD J. MOSSINGHOFF

Commissioner of Patents and Trademarks